(12) United States Patent
Yamamoto et al.

(10) Patent No.: US 12,054,397 B2
(45) Date of Patent: Aug. 6, 2024

(54) ACTIVATED CARBON MOLDED ARTICLE

(71) Applicant: KURARAY CO., LTD., Kurashiki (JP)

(72) Inventors: Takaharu Yamamoto, Bizen (JP);
Mitsunori Nishita, Bizen (JP);
Mitsunori Hitomi, Bizen (JP);
Takayuki Yamada, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 907 days.

(21) Appl. No.: 16/957,412

(22) PCT Filed: Dec. 14, 2018

(86) PCT No.: PCT/JP2018/046065
§ 371 (c)(1),
(2) Date: Jun. 24, 2020

(87) PCT Pub. No.: WO2019/131207
PCT Pub. Date: Jul. 4, 2019

(65) Prior Publication Data
US 2021/0070617 A1    Mar. 11, 2021

(30) Foreign Application Priority Data

Dec. 27, 2017   (JP) ................................ 2017-252391

(51) Int. Cl.
*C01B 32/354* (2017.01)
*F02M 25/08* (2006.01)

(52) U.S. Cl.
CPC ....... *C01B 32/382* (2017.08); *F02M 25/0854* (2013.01); *C01P 2004/12* (2013.01); *C01P 2006/12* (2013.01); *C01P 2006/14* (2013.01); *C01P 2006/16* (2013.01)

(58) Field of Classification Search
CPC .................................................. C01B 32/382
See application file for complete search history.

(56) References Cited

U.S. PATENT DOCUMENTS

| | | | | |
|---|---|---|---|---|
| 4,411,948 A | * | 10/1983 | Ogino | B01D 39/00 428/323 |
| 6,616,905 B1 | * | 9/2003 | Kawamura | B01J 31/06 502/514 |
| 2004/0118287 A1 | * | 6/2004 | Jaffe | B01D 53/0423 96/121 |
| 2009/0139407 A1 | | 6/2009 | Aono | |
| 2010/0212496 A1 | | 8/2010 | Hanamoto et al. | |
| 2013/0269521 A1 | | 10/2013 | Nishita et al. | |
| 2014/0124385 A1 | | 5/2014 | Yamasaki et al. | |
| 2018/0207611 A1 | | 7/2018 | Byrne et al. | |

FOREIGN PATENT DOCUMENTS

| | | |
|---|---|---|
| JP | 5-76754 A | 3/1993 |
| JP | 8-224468 A | 9/1996 |
| JP | 2006-213544 A | 8/2006 |
| JP | 2006-248890 A | 9/2006 |
| JP | 2009-131837 A | 6/2009 |
| JP | 2013-11243 A | 1/2013 |
| JP | 2013-177889 A | 9/2013 |
| JP | 2017-75068 A | 4/2017 |
| JP | WO2016/043049 A1 | 8/2017 |
| WO | WO 2007/077985 A1 | 7/2007 |
| WO | WO 2009/031467 A1 | 3/2009 |

OTHER PUBLICATIONS

Brazilian Office Action issued May 10, 2022 in Brazilian Patent Application No. 112020012954-2 (with English translation), 5 pages.
International Search Report issued on Feb. 19, 2019 in PCT/JP2018/046065, 2 pages.
English translation of the International Preliminary Report on Patentability and Written Opinion of the International Searching Authority issued on Jul. 9, 2020 in PCT/JP2018/046065 filed Dec. 14, 2018, 14 pages.
Korean Office Action issued May 19, 2023 in Korean Patent Application No. 10-2020-7016361, 4 pages.

* cited by examiner

*Primary Examiner* — Stuart L Hendrickson
(74) *Attorney, Agent, or Firm* — Oblon, McClelland, Maier & Neustadt, L.L.P.

(57) ABSTRACT

To provide an activated carbon molded article which can satisfactorily adsorb an evaporated fuel emitted from an automobile and can achieve low evaporated fuel emission performance during the long-time parking of an automobile. An activated carbon molded article having a specific surface area per volume, which is calculated from a specific surface area determined by the BET multipoint method and a packing density determined in accordance with JIS K 1474, of 290 to 520 $m^2/mL$, and also having an outer surface area per volume of 1.4 $m^2/L$ or more.

22 Claims, 5 Drawing Sheets

ACTIVATED CARBON MOLDED ARTICLE

TECHNICAL FIELD

The present invention relates to an activated carbon molded article, a method for producing the activated carbon molded article, and a canister equipped with the activated carbon molded article.

BACKGROUND ART

For example, in an automobile, a canister which can adsorb and desorb an evaporated fuel is used for the purpose of preventing the emission of the evaporated fuel from a fuel tank of the vehicle to the outside. In the canister, activated carbon is generally used as an adsorbent. Activated carbon can adsorb or trap the evaporated fuel from the fuel tank temporarily during parking, and can desorb the adsorbed evaporated fuel by substituting the evaporated fuel by sucked fresh air during driving. The desorbed evaporated fuel is then burned by means of an internal combustion engine.

As the activated carbon used in such a canister, activated carbon having fine pores onto which an evaporated fuel can be adsorbed has been widely used.

For example, Patent Document 1 proposes, as the activated carbon, an adsorbent which consists of activated carbon that has a high adsorption activity and a solid diluent that is adsorption-inactive and serves as a non-adsorptive part and which has the specified butane working capacity and the specified butane desorption ratio.

Patent Document 2 proposes an adsorbent for canisters, in which macroscopic pores are formed by adding meltable cores capable of disappearing upon calcination and a binder to an activated carbon powder having microscopic pores and then calcining the resultant mixture.

PRIOR ART DOCUMENTS

Patent Documents

Patent Document 1: JP-A-2013-177889
Patent Document 2: JP-A-2013-011243

SUMMARY OF THE INVENTION

Problems to be Solved by the Invention

In recent years, the number of hybrid vehicles each provided with both of a gasoline engine and an electric motor has been increasing. In the hybrid vehicle, the amount of purge air, which can desorb an evaporated fuel adsorbed in a canister and then introduce the desorbed evaporated fuel to an engine so as to use the introduced evaporated fuel as a fuel, is greatly reduced compared with a gasoline vehicle, and therefore the amount of load on the canister is increased. Even when the amount of load on a canister is large as mentioned above, it is required to achieve low emission performance. For satisfying this requirement, it is critical for the canister to have both of evaporated fuel adsorption performance and evaporated fuel desorption performance.

From the viewpoint of ventilation resistance that is critical property for a canister, it is preferred for an adsorbent (an activated carbon molded article) to have a certain level of size, e.g., a particle diameter of about 4 mm that is disclosed in Patent Document 2. In this large adsorbent, however, a portion of activated carbon which is placed in the inside of the adsorbent does not contribute to the adsorption or desorption of the evaporated fuel. As a result, the adsorption/desorption performance of the adsorbent may be deteriorated compared with fine activated carbon. In order to solve this problem, in the activated carbon molded article having a larger particle diameter which is disclosed in Patent Document 2, macroscopic pores are provided for the purpose of securing absorption/desorption performance. As a result, however, the strength of the activated carbon molded article may be deteriorated. A canister is installed in an automobile. Therefore, an adsorbent having higher strength has been demanded frequently for a canister.

In these situations, an object of the present invention is to provide an activated carbon molded article which can satisfactorily adsorb an evaporated fuel emitted from an automobile and can achieve low evaporated fuel emission performance during the long-time parking of an automobile.

A limited object of the present invention is to provide an activated carbon molded article which can satisfactorily adsorb an evaporated fuel emitted from an automobile, can achieve low evaporated fuel emission performance during the long-time parking of an automobile, and can have further improved strength.

Solutions to the Problems

The present inventors have made extensive and intensive studies. As a result, it is found that the above-mentioned problems can be solved by an activated carbon molded article having both of the specified specific surface area per volume and the specified outer surface area per volume. The finding leads to the accomplishment of the present invention.

The present invention includes the following preferred embodiments.

[1] An activated carbon molded article having a specific surface area per volume, which is calculated from a specific surface area determined by the BET multipoint method and a packing density determined in accordance with JIS K 1474, of 290 to 520 m$^2$/mL, and also having an outer surface area per volume of 1.4 m$^2$/L or more.

[2] The activated carbon molded article according to [1], wherein the activated carbon molded article has a pillar structure, and the pillar structure comprises: a pillar peripheral wall having, in an inside thereof, a hollow part opening at both ends in a pillar axis direction; and one or more partition walls which extend from one of openings of the hollow part to the other of the openings and divide the hollow part into two or more compartments.

[3] The activated carbon molded article according to [2], wherein the one or more partition walls are connected to the pillar peripheral wall and are not connected to each other.

[4] The activated carbon molded article according to [2] or [3], wherein, when a pillar cross section that is orthogonal to the pillar axis is observed, the number of the one or more partition walls is one, two or three, and each of the one or more partition walls is connected, at both ends thereof, to the pillar peripheral wall.

[5] The activated carbon molded article according to [2], wherein, when a pillar cross section that is orthogonal to the pillar axis is observed, at least two of the partition walls are connected to each other at a position other than the gravity center of the pillar cross section.

[6] The activated carbon molded article according to [2] or [5], wherein, when a pillar cross section that is orthogonal to the pillar axis is observed, at least two of the partition walls are connected to each other at one or two or more positions located on the pillar peripheral wall.

[7] The activated carbon molded article according to [6], wherein, when a pillar cross section that is orthogonal to the pillar axis is observed, the one or more partition walls are connected to each other at a position located on the pillar peripheral wall to form a triangular shape, a quadrangular shape or a pentagonal shape.

[8] The activated carbon molded article according to [2], comprising, as the partition walls: an inner wall which extends from one of the openings to the other of the openings and divides the hollow part into two compartments; and one or more connecting walls which extend from one of the openings to the other of the openings and connect the inner wall to the pillar peripheral wall.

[9] The activated carbon molded article according to [8], wherein, when a pillar cross section that is orthogonal to the pillar axis is observed, the inner wall has a circular shape, an elliptical shape, a triangular shape or a quadrangular shape.

[10] The activated carbon molded article according to [8] or [9], wherein the number of the one or more connecting walls is two, three or four.

[11] The activated carbon molded article according to any one of [2] to [10], wherein a thickness of the one or more partition walls falls within a range of −5% to +5% of a median value of the thickness of the one or more partition walls.

[12] The activated carbon molded article according to any one of [2] to [11], wherein a thickness of the pillar peripheral wall falls within a range of −5% to +5% of a median value of the thickness of the pillar peripheral wall.

[13] The activated carbon molded article according to any one of [2] to [12], wherein, when a pillar cross section that is orthogonal to the pillar axis is observed, a difference between the thickness of the one or more partition walls and the thickness of the pillar peripheral wall is 5% or less of a longest outer dimension of the pillar cross section.

[14] The activated carbon molded article according to any one of [2] to [13], wherein cross-sectional shapes of the pillar structure observed in the pillar axis direction are identical to each other.

[15] The activated carbon molded article according to any one of [2] to [14], wherein, when a pillar cross section that is orthogonal to the pillar axis is observed, each of the thickness of the pillar peripheral wall and the thickness of the one or more partition walls falls within a range of 5 to 35% of the longest outer dimension of the pillar cross section.

[16] The activated carbon molded article according to any one of [2] to [15], wherein each of the thickness of the pillar peripheral wall and the thickness of the one or more partition walls falls within a range of 0.3 to 1.0 mm.

[17] The activated carbon molded article according to any one of [2] to [16], wherein a ratio of an area of a void space part to an area of a wall part in a pillar cross section that is orthogonal to the pillar axis is 20 to 50%.

[18] The activated carbon molded article according to any one of [2] to [17], wherein, when a pillar cross section that is orthogonal to the pillar axis is observed, the longest outer dimension of the pillar cross section falls within a range of 3 to 9 mm.

[19] The activated carbon molded article according to any one of [1] to [18], wherein an average pore diameter determined by the HK method is 2.1 to 2.6 nm.

[20] The activated carbon molded article according to any one of [1] to [19], wherein a butane working capacity determined in accordance with ASTM D5228 is 8.0 to 10 g/dL.

[21] The activated carbon molded article according to any one of [1] to [20], wherein a pore volume determined by the BJH method is 0.480 to 0.555 mL/g.

[22] A method for producing the activated carbon molded article according to any one of [1] to [21], comprising: mixing powdery or granular activated carbon, a lubricant, and a solid diluent that is soluble in an acid together to prepare a mixture; kneading the mixture with a binder and water to prepare a kneaded product, and then molding the kneaded product into a desired shape to prepare a molded article; and drying the molded article, then washing the dried molded article with the acid to elute and remove at least a portion of the solid diluent, and then drying the resultant product.

[23] A canister comprising the activated carbon molded article according to any one of [1] to [21].

Effects of the Invention

According to the present invention, an activated carbon molded article can be provided, which can satisfactorily adsorb an evaporated fuel from an automobile and can also achieve low evaporated fuel emission performance during the long-time parking of an automobile.

EMBODIMENTS OF THE INVENTION

[Activated Carbon Molded Article]

Figure 1:
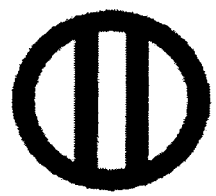
FIG. 1 shows a schematic illustration of a cross section of an activated carbon molded article produced in accordance with Example 1, wherein the cross section is orthogonal to the pillar axis.

The activated carbon molded article according to the present invention has a specific surface area per volume, which is calculated from a specific surface area determined by the BET multipoint method and a packing density determined in accordance with JIS K 1474, of 290 to 520 $m^2/mL$, and also has an outer surface area per volume of 1.4 $m^2/L$ or more.

The specific surface area per volume is a product of a specific surface area determined by the BET multipoint method and a packing density determined in accordance with JIS K 1474, and can be determined by the method mentioned below in the section "EXAMPLES". The outer surface area per volume can be determined by the method mentioned below in the section "EXAMPLES". If each of the specific surface area per volume and the outer surface area per volume does not satisfy the requirement that it has a value falling within the above-mentioned specified numerical range or a value equal to or more than the above-mentioned specified lower limit value, the activated carbon molded article cannot have all of a desired butane working capacity, high purge efficiency and a small butane residual amount. The matter that purge efficiency is high and a butane residual amount is low means that the activated carbon molded article has excellent desorption performance. When desorption performance is excellent, an evaporated fuel can be desorbed satisfactorily even if the amount of purged air is small, resulting in the decrease in a butane residual amount. As a result, low evaporated fuel emission performance can be achieved.

The specific surface area per volume is preferably 300 to 500 $m^2/mL$, more preferably 330 to 470 $m^2/mL$, and the outer surface area per volume is preferably 1.41 $m^2/L$ or more. When each of the specific surface area per volume and the outer surface area per volume satisfies the requirement that it has a value falling within the above-mentioned specified numerical range or a value equal to or more than the above-mentioned specified lower limit value, the activated carbon molded article tends to have the desired butane working capacity as well as the high purge efficiency and the small butane residual amount.

The adjustment of each of the specific surface area per volume and the outer surface area per volume to a value falling within the specified numerical range or a value equal to or more than the specified lower limit value can be achieved by, for example, controlling the degree of activation of activated carbon or the ratio of materials to be blended.

The adjustment of each of the specific surface area per volume and the outer surface area per volume to a value falling within the specified numerical range or a value equal to or more than the specified lower limit value can be achieved by molding the activated carbon molded article into a specified shape. Accordingly, in a specific embodiment of the present invention, the activated carbon molded article has a pillar structure, and the pillar structure comprises: a pillar peripheral wall having, in an inside thereof, a hollow part opening at both ends in the pillar axis direction; and one or more partition walls which extend from one of openings of the hollow part to the other of the openings and divide the hollow part into two or more compartments.

Examples of the pillar structure include a cylinder-like structure, an elliptical cylinder-like structure, and an approximately prism-like structure. The shape of a pillar cross section orthogonal to the pillar axis of each of these structures may partly include irregularities or may have rounded corners, and may have a circular, elliptical or polygonal shape when observed macroscopically. Examples of the approximately prism-like structure include an approximately triangular prism-like structure, an approximately quadrangular prism-like structure, an approximately pentagonal prism-like structure, an approximately hexagonal prism-like structure and an approximately octagonal prism-like structure. From the viewpoint of more readily achieving abrasion strength required when the activated carbon molded article is used in a canister, an approximately prism-like structure in which the corners in the pillar cross section are rounded is preferred. From the same viewpoint, a cylinder-like structure and an elliptical cylinder-like structure are also preferred. From the viewpoint of more readily achieving the desired butane working capacity, the high purge efficiency and the small butane residual amount, the pillar structure is more preferably a regular-cylinder-like structure.

Hereinbelow, specific embodiments will be described in detail with reference to the appended drawings as required.

In a specific embodiment of the present invention, the one or more partition walls are connected to the pillar peripheral wall and are not connected to each other. The schematic illustrations of pillar cross sections each orthogonal to a pillar axis in specific examples of this embodiment are shown in FIGS. 1 and 4 to 11.

In a specific embodiment of the present invention, when a pillar cross section that is orthogonal to the pillar axis is observed, the number of the one or more partition walls is one, two or three, and each of the one or more partition walls is connected, at both ends thereof, to the pillar peripheral wall. The schematic illustrations of pillar cross sections each orthogonal to a pillar axis in specific examples of this embodiment are shown in FIGS. 1 and 4 to 11.

When the activated carbon molded article has any one of these specific shapes in each of which the partition walls are not connected to each other, the decrease in the contact efficiency between the activated carbon molded article and the evaporated fuel, which may be caused as the result of the increase in the thickness at a connecting part when the partition walls are connected to each other, cannot occur. Accordingly, it is possible to more readily adjust each of the specific surface area per volume and the outer surface area per volume to a value falling within the specified numerical range or a value equal to or more than the specified lower limit value.

Figure 4:
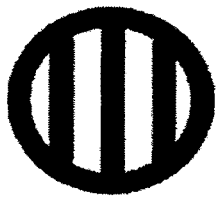
FIG. 4 shows a schematic illustration of a cross section of an activated carbon molded article produced in accordance with Example 4, wherein the cross section is orthogonal to the pillar axis.
Figure 5:
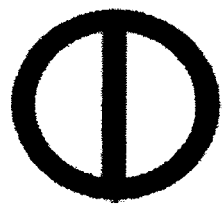
FIG. 5 shows a schematic illustration of a cross section of an activated carbon molded article according to one embodiment of the present invention, wherein the cross section is orthogonal to the pillar axis.

In FIGS. 1, 4 and 5, there is/are one, two or three partition walls which are not connected to each other, wherein each of the partition walls is connected at both ends thereof to the pillar peripheral wall to form an I-shaped, II-shaped or III-shaped structure.

Figure 6:
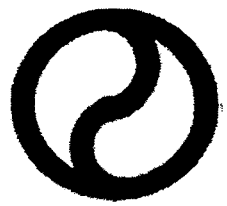
FIG. 6 shows a schematic illustration of a cross section of an activated carbon molded article according to one embodiment of the present invention, wherein the cross section is orthogonal to the pillar axis.
Figure 7:
FIG. 7 shows a schematic illustration of a cross section of an activated carbon molded article according to one embodiment of the present invention, wherein the cross section is orthogonal to the pillar axis.
Figure 8:
FIG. 8 shows a schematic illustration of a cross section of an activated carbon molded article according to one embodiment of the present invention, wherein the cross section is orthogonal to the pillar axis.

In FIGS. 6 to 8, there is/are one, two or three partition walls which are not connected to each other, wherein each of the partition walls is connected at both ends thereof to the pillar peripheral wall to form an S-shaped, SS-shaped or SSS-shaped structure.

Figure 9:
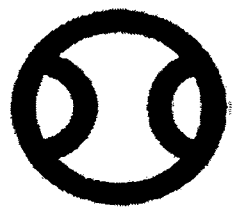
FIG. 9 shows a schematic illustration of a cross section of an activated carbon molded article according to one embodiment of the present invention, wherein the cross section is orthogonal to the pillar axis.
Figure 10:
FIG. 10 shows a schematic illustration of a cross section of an activated carbon molded article according to one embodiment of the present invention, wherein the cross section is orthogonal to the pillar axis.

In FIGS. 9 and 10, there are two or three partition walls which are not connected to each other, wherein each of the partition walls is curved and is connected at both ends thereof to the pillar peripheral wall.

Figure 11:
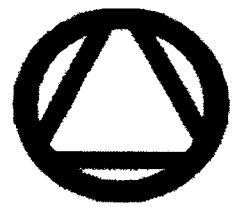
FIG. 11 shows a schematic illustration of a cross section of an activated carbon molded article according to one embodiment of the present invention, wherein the cross section is orthogonal to the pillar axis.

In FIG. 11, there are three partition walls, wherein each of the partition walls is connected at both ends thereof to the pillar peripheral wall to form a triangle-like shape in which the sides are not connected to one another.

In a specific embodiment of the present invention, when a pillar cross section that is orthogonal to the pillar axis is observed, at least two of the partition walls are connected to each other at a position other than the gravity center of the pillar cross section. Examples of this embodiment include: a case where, when a pillar cross section orthogonal to a pillar axis is observed, two partition walls together form a T-shape; and a case where, when a pillar cross section orthogonal to a pillar axis is observed, three partition walls together form an H-shape.

In a specific embodiment of the present invention, when a pillar cross section that is orthogonal to the pillar axis is observed, at least two of the partition walls are connected to each other at one or two or more positions located on the pillar peripheral wall. Examples of this embodiment include: a case where, when a pillar cross section orthogonal to a pillar axis is observed, two partition walls together form a V-shape; a case where, when a pillar cross section orthogonal to a pillar axis is observed, three partition walls together form an A-shape or an N-shape; and a case where, when a pillar cross section orthogonal to a pillar axis is observed, three partition walls together form a triangle-like shape in which one or two vertices are unclosed.

Figure 2:
FIG. 2 shows a schematic illustration of a cross section of an activated carbon molded article produced in accordance with Example 2, wherein the cross section is orthogonal to the pillar axis.
Figure 3:
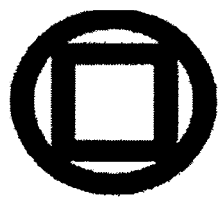
FIG. 3 shows a schematic illustration of a cross section of an activated carbon molded article produced in accordance with Example 3, wherein the cross section is orthogonal to the pillar axis.
Figure 12:
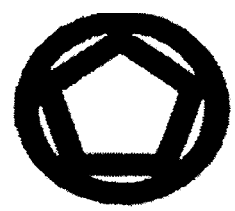
FIG. 12 shows a schematic illustration of a cross section of an activated carbon molded article according to one embodiment of the present invention, wherein the cross section is orthogonal to the pillar axis.
Figure 13:
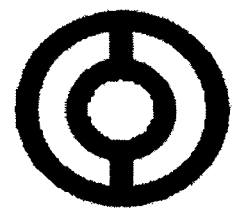
FIG. 13 shows a schematic illustration of a cross section of an activated carbon molded article according to one embodiment of the present invention, wherein the cross section is orthogonal to the pillar axis.
Figure 14:
FIG. 14 shows a schematic illustration of a cross section of an activated carbon molded article according to one embodiment of the present invention, wherein the cross section is orthogonal to the pillar axis.
Figure 15:
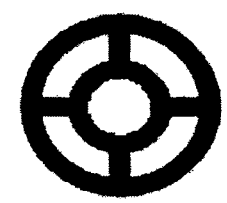
FIG. 15 shows a schematic illustration of a cross section of an activated carbon molded article according to one embodiment of the present invention, wherein the cross section is orthogonal to the pillar axis.
Figure 16:
FIG. 16 shows a schematic illustration of a cross section of an activated carbon molded article according to one embodiment of the present invention, wherein the cross section is orthogonal to the pillar axis.
Figure 17:
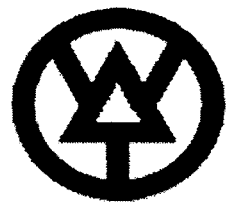
FIG. 17 shows a schematic illustration of a cross section of an activated carbon molded article according to one embodiment of the present invention, wherein the cross section is orthogonal to the pillar axis.
Figure 18:
FIG. 18 shows a schematic illustration of a cross section of an activated carbon molded article according to one embodiment of the present invention, wherein the cross section is orthogonal to the pillar axis.
Figure 19:
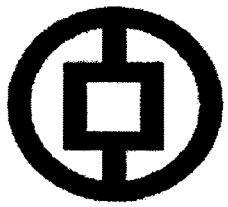
FIG. 19 shows a schematic illustration of a cross section of an activated carbon molded article according to one embodiment of the present invention, wherein the cross section is orthogonal to the pillar axis.
Figure 20:
FIG. 20 shows a schematic illustration of a cross section of an activated carbon molded article according to one embodiment of the present invention, wherein the cross section is orthogonal to the pillar axis.
Figure 21:
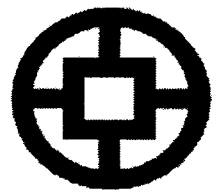
FIG. 21 shows a schematic illustration of a cross section of an activated carbon molded article according to one embodiment of the present invention, wherein the cross section is orthogonal to the pillar axis.

In a specific embodiment of the present invention, when a pillar cross section that is orthogonal to the pillar axis is observed, the one or more partition walls are connected to each other at a position located on the pillar peripheral wall to form a triangular shape, a quadrangular shape or a pentagonal shape. The schematic illustrations of pillar cross sections in this embodiment are shown in FIGS. 2, 3 and 12.

In another specific embodiment of the present invention, the activated carbon molded article comprises as the partition walls: an inner wall which extends from one of the openings to the other of the openings and divides the hollow part into two compartments; and one or more connecting walls which extend from one of the openings to the other of the openings and connect the inner wall to the pillar peripheral wall.

In the specific embodiment of the present invention, when a pillar cross section orthogonal to a pillar axis is observed, the inner wall has a circular shape, an elliptical shape, a triangular shape or a quadrangular shape.

In the specific embodiment of the present invention, the number of the one or more connecting walls is two, three or four.

The schematic illustrations of pillar cross sections each orthogonal to the pillar axis in specific examples of these embodiments are shown in FIGS. 13 to 21.

Figure 22:
FIG. 22 shows a schematic illustration of a side surface of an activated carbon molded article produced in accordance with Example 1.

In the activated carbon molded articles of which the pillar cross sections each orthogonal to the pillar axis are shown in FIGS. 1 to 21, all of the schematic illustrations of side surfaces of the activated carbon molded articles observed from the lateral sides are common with one another, and are the same as that (FIG. 22) of the activated carbon molded article produced in accordance with Example 1.

From the viewpoint of more readily achieving the desired butane working capacity, the high purge efficiency and the small butane residual amount, the thickness of the partition wall preferably falls within the range of −5% to +5%, more preferably within the range of −4% to +4%, particularly preferably within the range of −3% to +3%, of the median value of the thickness of the partition wall. The matter that the thickness of the partition wall is closer to the median value of the thickness of the partition wall means that the thickness of the partition wall is more uniform, which is preferred in the present invention.

From the viewpoint of more readily achieving the desired butane working capacity, the high purge efficiency and the small butane residual amount, the thickness of the pillar peripheral wall preferably falls within the range of −5% to +5%, more preferably within the range of −4% to +4%, particularly preferably within the range of −3% to +3%, of the median value of the thickness of the pillar peripheral wall. The matter that the thickness of the pillar peripheral wall is closer to the median value of the thickness of the pillar peripheral wall means that the thickness of the pillar peripheral wall is more uniform, which is preferred in the present invention.

From the viewpoint of more readily achieving the desired butane working capacity, the high purge efficiency and the small butane residual amount, when a pillar cross section orthogonal to the pillar axis is observed, the difference between the thickness of the partition wall and the thickness of the pillar peripheral wall is preferably 5% or less, more preferably 3% or less, particularly preferably 0%, of the longest outer dimension of the pillar cross section. With respect to the term "longest outer dimension" used herein: when the pillar is a cylinder, the term refers to an outer diameter of the cylinder or a dimension corresponding to the outer diameter; when the pillar is an elliptical cylinder, the terms refers to the length of a longer axis of a pillar cross section of the elliptical cylinder or a dimension corresponding to the length; and when the pillar is an approximate prism, the term refers to the length of a longest diagonal line of a pillar cross section of the approximate prism or a dimension corresponding to the length. The matter that the difference is smaller means that the thickness of the partition wall and the thickness of the pillar peripheral wall are more uniform, which is preferred in the present invention.

From the viewpoint of more readily achieving the desired butane working capacity, the high purge efficiency and the small butane residual amount, cross-sectional shapes of the pillar structure observed in the pillar axis direction are identical to each other. This type of shape can be produced by producing the activated carbon molded article by, for example, extrusion molding or tableting molding.

From the viewpoint of more readily achieving the desired butane working capacity, the high purge efficiency and the small butane residual amount, when a pillar cross section orthogonal to the pillar axis is observed, the thickness of each of the pillar peripheral wall and the partition wall falls within a range of preferably 5 to 35%, more preferably 7 to 25%, particularly preferably 10 to 20%, of the longest outer dimension of the pillar cross section.

The thickness of each of the pillar peripheral wall and the partition wall is preferably 0.3 to 1.0 mm, more preferably 0.4 to 0.95 mm, particularly preferably 0.5 to 0.9 mm. When the thickness of each of the pillar peripheral wall and the partition wall falls within the above-mentioned range, the small butane residual amount and the high hardness can be achieved more readily.

In a pillar cross section orthogonal to the pillar axis, the ratio of the area of a void space part to the area of a wall part is preferably 20 to 50%, more preferably 25 to 45%, particularly preferably 30 to 40%. When the ratio falls within the above-mentioned range, the small butane residual amount and the high hardness can be achieved more readily.

When a pillar cross section orthogonal to the pillar axis is observed, the longest outer dimension is preferably 3 to 9 mm, more preferably 4 to 7 mm, particularly preferably 4 to 6 mm. When the longest outer dimension falls within the above-mentioned range, the small butane residual amount can be achieved more readily while reducing ventilation resistance.

The thickness of the partition wall, the thickness of the pillar peripheral wall and the median values of these thicknesses, the longest outer dimension, and the ratio of the area of the void space part to the area of the wall part can be determined by the methods mentioned below in the section "EXAMPLES". Each of these values can be adjusted by controlling, for example, the shape of a nozzle in a case where the activated carbon molded article is produced by extrusion molding or the shape of a mold in a case where the activated carbon molded article is produced by tableting molding.

In a connecting part between the pillar peripheral wall and the partition wall or a connecting part between the partition walls, the amount of activated carbon in the inside of the connecting part (but on the surfaces of the walls) is larger than that in the pillar peripheral wall or the partition wall excluding the connecting part. This is not desirable, because the contact efficiency with an evaporated fuel may be decreased. Therefore, it is preferred to reduce the amount of activated carbon in the above-mentioned inside. More specifically, it is preferred to partially decrease the thickness of the pillar peripheral wall or the partition wall at the connecting part. This can be achieved by controlling the shape of a nozzle in a case where the activated carbon molded article is produced by extrusion molding or the shape of a mold in a case where the activated carbon molded article is produced by tableting molding.

The average pore diameter of the activated carbon molded article of the present invention determined by the HK method is preferably 2.1 to 2.6 nm, more preferably 2.1 to 2.4 nm, particularly preferably 2.1 to 2.2 nm. When the average pore diameter falls within the above-mentioned range, the desired butane working capacity can be achieved more readily. The adjustment of the average pore diameter to a value falling within the above-mentioned range can be achieved by, for example, controlling the degree of activation of activated carbon. The average pore diameter can be determined by the method mentioned below in the section "EXAMPLES".

The butane working capacity of the activated carbon molded article of the present invention determined in accordance with ASTM D5228 is preferably 8.0 to 10 g/dL, more preferably 8.0 to 9.8 g/dL, particularly preferably 8.0 to 9.7 g/dL. When the butane working capacity falls within the above-mentioned range, an evaporated fuel can be desorbed more readily. The adjustment of the butane working capacity to a value falling within the above-mentioned range can be achieved by, for example, controlling the degree of activation of activated carbon or the ratio of materials to be blended.

The butane residual amount of the activated carbon molded article of the present invention determined in accordance with ASTM D5228 is preferably 1.30/dL or less, more preferably 1.25 g/dL or less, particularly preferably 1.20 g/dL or less. The matter that the butane residual amount is smaller means that desorption performance is more superior, which is preferred in the present invention. The adjustment of the butane residual amount to a value equal to or less than the above-mentioned value can be achieved by, for example, controlling the degree of activation of activated carbon or the ratio of materials to be blended.

In the activated carbon molded article of the present invention, the microstrength hardness (also referred to as "MS hardness", hereinafter) is preferably 60% or more, more preferably 70% or more, particularly preferably 75% or more. The MS hardness is a measure for the resistance to a weight load, and can be determined by the method mentioned below in the section "EXAMPLES". When the activated carbon molded article has MS hardness equal to or more than the above-mentioned value, the abrasion strength of the activated carbon molded article which is necessary for use in a canister can be achieved more readily. The adjustment of the MS hardness to a value equal to or more than the above-mentioned value can be achieved by, for example, controlling the amount of the binder to be blended.

The amount of fine powder in the activated carbon molded article of the present invention is preferably 0.12% or less, more preferably 0.10% or less, more preferably 0.07% or less, more preferably 0.05% or less, particularly preferably 0.025% or less. When the amount of fine powder is equal to or less than the above-mentioned value, the amount of dust generated when the activated carbon molded article is used in a canister can be reduced more readily. The adjustment of the amount of fine powder to a value equal to or less than the above-mentioned value can be achieved by, for example, controlling the amount of the binder to be blended. The amount of fine powder can be determined by the method mentioned below in the section "EXAMPLES".

The pore volume of the activated carbon molded article of the present invention determined by the BJH method is preferably 0.480 to 0.555 mL/g, more preferably 0.490 to 0.545 mL/g, particularly preferably 0.500 to 0.535 mL/g. When the pore volume determined by the BJH method falls within the above-mentioned range, the desired butane working capacity can be achieved more readily. The adjustment of the pore volume determined by the BJH method to a value falling within the above-mentioned range can be achieved by, for example, controlling the degree of activation of activated carbon or the ratio of materials to be blended. The pore volume can be determined by the method mentioned below in the section "EXAMPLES".

The activated carbon molded article according to the present invention has the specified specific surface area per volume, which is calculated from a specific surface area determined by the BET multipoint method and a packing density determined in accordance with JIS K 1474, and the specified outer surface area per volume, and therefore can achieve satisfactory evaporated fuel adsorption as well as low evaporated fuel emission performance. Furthermore, the activated carbon molded article of the present invention can also have a small fine powder amount and high MS hardness. For these reasons, the activated carbon molded article of the present invention can be used suitably in a canister. Accordingly, another subject matter of the present invention is a canister equipped with the activated carbon molded article of the present invention. The activated carbon molded article of the present invention is applicable to various evaporated fuels, such as normal gasoline that is a common automobile fuel as well as a gasoline containing an alcohol.

[Method for Producing Activated Carbon Molded Article]

The activated carbon molded article of the present invention can be produced by, for example, a method comprising: mixing powdery or granular activated carbon, a lubricant, and a solid diluent that is soluble in an acid together to prepare a mixture; kneading the mixture with a binder and water to prepare a kneaded product, and then molding the kneaded product into a desired shape to prepare a molded article; and drying the molded article, then washing the dried molded article with the acid to elute and remove at least a portion of the solid diluent, and then drying the resultant product

[Powdery or Granular Activated Carbon]

Powdery or granular activated carbon is a product produced by pulverizing activated carbon, which is produced by carbonizing and activating a carbonaceous material that is a raw material, into particles having an average particle diameter of, for example, 1 to 500 μm, preferably 1 to 100 μm, more preferably 10 to 50 μm.

The carbonaceous material is not particularly limited, as long as the carbonaceous material can form activated carbon through carbonization and activation, and can be selected from a plant-derived carbonaceous material, a mineral-derived carbonaceous material, a natural material and a synthetic material. More specifically, examples of the plant-derived carbonaceous material include wood, bamboo, wood coal, rice hull and fruit bull such as coconut shell; and examples of the mineral-derived carbonaceous material include a coal (e.g., peat coal, lignite coal, subbituminous coal, bituminous coal, semi-anthracite coal and anthracite coal), a petroleum-derived and/or non-petroleum-derived pitch, and coke. Examples of the natural material include starch, cellulose (e.g., a natural fiber such as cotton and hemp), a recycled resin (e.g., a recycled fiber such as rayon and viscose rayon), and a semisynthetic resin (e.g., a semisynthetic fiber such as acetate and triacetate); and examples of the synthetic material include a polyamide-based resin such as Nylon-66, a polyvinyl alcohol-based resin such as vinylon, an acrylic-based resin (e.g., a polyacrylonitrile-based resin), a polyolefin-based resin (e.g., polyethylene and polypropylene), a vinyl chloride-based resin, a polyurethane-based resin, a phenolic-based resin, a furan-based resin and an epoxy-based resin. These carbonaceous materials may be used singly, or two or more of them may be used in combination.

Among these carbonaceous materials, from the viewpoint of more readily producing an activated carbon molded article having the desired butane working capacity, the high purge efficiency and the small butane residual amount, it is preferred to use a mineral-derived carbonaceous material, it is more preferred to use a coal, and it is particularly preferred to use bituminous coal and/or anthracite coal.

The conditions to be employed for the carbonization and activation of the carbonaceous material are not particularly limited, and any one of conventional conditions may be employed. In general, the carbonization of the carbonaceous material is carried out at, for example, 400 to 800° C., preferably 500 to 800° C., more preferably 550 to 750° C., while blocking oxygen or air. In general, the activation of the carbonized carbonaceous material is carried out at, for example, 700 to 1200° C., preferably 800 to 1100° C., under an activation gas (e.g., water vapor, a carbon dioxide gas) atmosphere.

The butane working capacity of the activated carbon obtained after the activation is, for example, 10 to 20 g/dL, preferably 12.5 to 18 g/dL, more preferably 13 to 16 g/dL, determined in accordance with ASTM D5228.

The BET specific surface area of the activated carbon obtained after the activation is, for example, 250 to 1500 m$^2$/g, preferably 350 to 1400 m$^2$/g, more preferably 500 to 1300 m$^2$/g.

The average pore diameter of the activated carbon obtained after the activation is, for example, 0.1 to 100 nm, preferably 0.3 to 50 nm, more preferably 0.3 to 25 nm, more preferably 0.5 to 10 nm, particularly preferably 0.5 to 5 nm.

[Lubricant]

As the lubricant, one or more compounds selected from the group consisting of a bentonite-type compound, a cellulose-type compound and a polyvinyl alcohol-type compound can be used, for example. Examples of the bentonite-type compound include sodium bentonite and calcium bentonite. Examples of the cellulose-type compound include cellulose, a cellulose derivative [e.g., a cellulose ether, such as an alkyl cellulose including methyl cellulose (also referred to as "MC", hereinafter); carboxymethyl cellulose or a salt thereof; a hydroxyalkyl cellulose including hydroxyethyl cellulose and hydroxypropyl cellulose; and a hydroxyalkylalkyl cellulose including hydroxypropylmethyl cellulose], and methyl cellulose and/or carboxymethyl cellulose are preferably used. Examples of the polyvinyl alcohol-type compound include polyvinyl alcohol and various modified polyvinyl alcohol compounds.

The amount of the lubricant to be used is preferably 5 to 25 parts by mass, more preferably 5 to 20 parts by mass, particularly preferably 5 to 18 parts by mass, per 100 parts by mass of the powdery or granular activated carbon.

[Solid Diluent Soluble in Acid]

At least a portion of the solid diluent soluble in an acid is eluted/removed in the subsequent acid washing step, and the eluted/removed parts become pores in the activated carbon molded article. Therefore, the activated carbon molded article has both of micropores in the powdery or granular activated carbon which are formed as the result of the activation (wherein the micropores are also referred to as "activation-derived micropores", hereinafter) and pores which are formed as the result of the elution/removal of the solid diluent (wherein the pores are also referred to as "elution/removal-derived pores", hereinafter). By the formation of the elution/removal-derived pores, the packing density can be controlled and the specific surface area per volume, which is calculated from a specific surface area determined by the BET multipoint method and a packing density determined in accordance with JIS K 1474, in the present invention can also be controlled. The activated carbon molded article having the elution/removal-derived pores can have practically suitable hardness.

Examples of the solid diluent soluble in an acid include: an inorganic compound, e.g., a metal oxide such as magnesium oxide, a metal carbonate such as magnesium carbonate and calcium carbonate, and a metal hydroxide such as calcium hydroxide; and a basic polymer, e.g., a homopolymer or copolymer prepared using an N,N-dialkylamino-$C_{2-3}$-alkyl (meth)acrylate as a monomer. These solid diluents may be used singly, or two or more of them may be used in combination. In the elution with the acid, it is preferred to use a solid diluent that forms an elution product having a lower viscosity, rather than a polymer that tends to become viscous. An example of the solid diluent of this type includes calcium carbonate.

The average particle diameter of the solid diluent can be selected appropriately depending on the intended sizes of the elution/removal-derived pores, and is, for example, 0.1 to 30 μm, preferably 0.1 to 20 μm, more preferably 0.2 to 15 μm, particularly preferably 0.2 to 10 μm. The ratio of the average particle diameter of the powdery or granular activated carbon to the average particle diameter of the solid diluent is, for example, 300/1 to 0.01/1, preferably 250/1 to 1/1, more preferably 100/1 to 10/1.

The amount of the solid diluent to be used can be selected appropriately depending on the intended sizes or the intended content ratio of the elution/removal-derived pores, and is, for example, 10 to 150 parts by mass, usually 25 to 150 parts by mass, preferably 40 to 150 parts by mass, more preferably 50 to 130 parts by mass, particularly preferably 55 to 120 parts by mass, per 100 parts by mass of the powdery or granular activated carbon.

The mixing of the powdery or granular activated carbon, the lubricant and the solid diluent soluble in an acid can be carried out by a conventional method.

Subsequently, the resultant mixture is kneaded with a binder and water.

[Binder]

As the binder, a material can be used which cannot be eluted or deteriorated within a short time of period in such an atmosphere where an evaporated fuel can be adsorbed and desorbed and which is insoluble in an acid. From the viewpoint of the fact that the hardness of the activated carbon molded article can be determined depending on the type or amount of the binder to be used and that the pores in the activated carbon may be closed by the binder, it is needed to select the type of the binder to be used and to adjust the amount of the binder to be used.

The binder may be a thermoplastic resin or a thermally curable resin. Examples of the binder include a polyolefin-based resin [e.g., polyethylene, an ethylene-(vinyl acetate) copolymer, an ethylene-((meth)acrylic acid ester) copolymer, and an ethylene-((meth)acrylic acid) copolymer], an acrylic-based resin, a polyester-based resin, an epoxy-based resin and a silicone-based resin. These binders may be used singly, or two or more of them may be used in combination. The binder may be a thermally adhesive resin such as a hot-melt adhesive agent, or may be a water-based one (i.e., one having a form dissolved or dispersed in an aqueous medium) or an oil-based one (i.e., one having a form dissolved in an organic solvent). The binder is often used in the form of a dispersion such as an acrylic-based resin emulsion (particularly a water-based dispersion such as an emulsion).

The content ratio of the binder is, for example, 5 to 35 parts by mass, preferably 7 to 30 parts by mass, more preferably 9 to 25 parts by mass, particularly preferably 10 to 20 parts by mass, in terms of solid content, per 100 parts by mass of the powdery or granular activated carbon.

In order to control the density and kneadability of the kneaded product, water is also used in the kneading of the mixture of the powdery or granular activated carbon, the lubricant and the solid diluent with the binder. The amount of the water to be used is, for example, 100 to 300 parts by mass, preferably 110 to 250 parts by mass, more preferably 120 to 200 parts by mass, per 100 parts by mass of the powdery or granular activated carbon.

The kneading can be carried out by a conventional method using, for example, a mixer, a ribbon mixer, a static mixer, a ball mill, a sample mill or a kneader. The kneading temperature is generally 0 to 50° C., preferably 5 to 40° C., from the viewpoint of the reduction of the variations in water content. The kneading time is generally 1 to 60 minutes, preferably 5 to 30 minutes, from the viewpoint of the prevention of the oxidative deterioration of the binder and the production efficiency.

Subsequently, the resultant kneaded product is molded into a desired shape by, for example, tableting molding or extrusion molding. The extrusion molding of the kneaded product includes the cutting of an extruded strand. After the cutting, a desired shape can be produced. The term "desired shape" used herein refers to a shape whereby the specified specific surface area per volume, which is calculated from a specific surface area determined by the BET multipoint method and a packing density determined in accordance with JIS K 1474, and the specified outer surface area per volume can be provided to the activated carbon molded article. An example of the desired shape is a shape having a pillar structure, wherein the pillar structure comprises: a pillar peripheral wall having, in an inside thereof, a hollow part opening at both ends in the pillar axis direction, and one or more partition walls which extend from one of the openings of the hollow part to the other of the openings and divide the hollow part into two or more compartments.

Subsequently, the resultant molded article is dried, is then washed with the acid to elute and remove the solid diluent, and is then further dried. In this manner, the activated carbon molded article can be produced. As mentioned above, the activated carbon molded article has the elution/removal-derived pores in addition to the activation-derived micropores.

The methods respectively for drying before and after the washing with the acid are not particularly limited, and the drying may be carried out using a conventional drying machine under an atmosphere of air, an inert gas (e.g., nitrogen) or a mixture thereof. From the viewpoint of the prevention of the deterioration of the binder and the production efficiency, the drying temperature is generally 60 to 150° C., preferably 70 to 140° C. The drying time is determined depending on the drying temperature or the like to be employed, and is generally 0.1 to 36 hours, preferably 0.5 to 24 hours.

Examples of the acid to be used for the elution/removal of the solid diluent include: an inorganic acid such as hydrochloric acid and nitric acid; and an organic acid such as acetic acid, trichloroacetic acid, trifluoroacetic acid, formic acid and citric acid. These acids may be used singly, or two or more of them may be used in combination. From the viewpoint of safety, availability and cost, hydrochloric acid is preferred.

The acid is generally used in the form of an aqueous solution, and the concentration of the acid in the aqueous solution is generally 0.5 to 3 mol/L, preferably 0.8 to 2.5 mol/L. The amount of the aqueous acid solution to be used is generally 0.5 to 2 L, preferably 0.8 to 1.5 L, per 100 g of the molded article.

As the method for the washing, a method comprising bringing a dried product of the molded article into contact with the aqueous acid solution can be employed. The washing efficiency can be improved by mixing the dried molded article with the aqueous acid solution and then stirring the resultant mixture, or boiling the resultant mixture, or warming the resultant mixture to 50 to 90° C. Alternatively, an ultrasonic washing machine may be used for the washing.

The washing time is determined depending on the temperature or the like to be employed, and is generally 0.1 to 48 hours, preferably 0.5 to 24 hours. The number of the washing procedures is preferably 1 to 5 times in a case where the washing with the acid is carried out while boiling, and is preferably 1 to 10 times in a case where the washing with the acid is carried out while warming.

EXAMPLES

Hereinbelow, the present invention will be described in more detail by way of the Examples. However, it is not intended to limit the scope of the present invention. The properties of the activated carbon molded articles produced in Examples and Comparative Examples were evaluated as follows.

[Average Particle Diameter]

The particle diameters of powdery activated carbon served as a raw material were measured by a laser diffraction measurement method. More specifically, the particle diameters were measured by subjecting a liquid dispersion prepared by mixing powdery activated carbon to be measured, a surfactant and ion exchange water together to a transmissivity method using a laser diffraction/scattering particle diameter distribution measurement device (manufactured by Microtrac BEL Corporation, "MT3300II"). The concentration of the activated carbon in the liquid dispersion was adjusted so as to fall within the measurement concentration range indicated in the device. As the surfactant used in the preparation of the liquid dispersion, "polyoxyethylene(10) octylphenyl ether" (manufactured by Wako Pure Chemical Corporation) was used in such a proper amount that air bubbles or the like, which might affect the measurement, were not generated. The conditions for the analysis are shown below.

Number of measurement procedures: 1 time
Measurement time: 30 seconds
Indication of distribution: by volume
Classification of particle diameters: standard
Calculation mode: MT3000II
Name of solvent: WATER
Measurement upper limit: 2000 μm
Measurement lower limit: 0.021 μm
Ratio of residue: 0.00
Ratio of transmitted matter: 0.00
Setting of ratio of residue: invalid
Transmissivity of particles: transmissive
Refractive index of particles: 1.81
Shape of particles: non-spherical
Refractive index of solvent: 1.333
DV value: 0.0150 to 0.0700
Transmission rate (TR): 0.700 to 0.950

In the measurement results, a D50 value was employed as an average particle diameter.

[Specific Surface Area Per Volume]

The specific surface area per volume of an activated carbon molded article was calculated from a specific surface area determined by the BET multipoint method and a packing density determined in accordance with JIS K 1474.

A nitrogen absorption isothermal line at 77K was produced using BELSORP-max (manufactured by Microtrac BEL Corporation), and the specific surface area was determined from the absorption isothermal line employing the BET multipoint method (the Brunauer Emmett Teller multipoint method).

The packing density was determined in accordance with JIS K 1474.

The specific surface area per volume was calculated from the specific surface area and the packing density in accordance with the following formula.

Specific surface area per volume $[m^2/mL]$=(specific surface area $[m^2/g]$)×(packing density $[g/mL]$)  [Mathematical formula 1]

[Average Pore Diameter Determined by the HK Method]

A nitrogen absorption isothermal line at 77K was produced using BELSORP-max (manufactured by Microtrac BEL Corporation), and the pore volume of an activated carbon molded article was determined from the absorption isothermal line employing the HK method (the Horvath Kawazoe method).

The average pore diameter determined by the HK method was calculated from the pore volume and the specific surface area determined by the BET multipoint method in accordance with the following formula.

Average pore diameter determined by the HK method [nm]=4000×(pore volume [mL/g] by the HK method)/(BET specific surface area $[m^2/g]$)  [Mathematical formula 2]

[Longest outer dimension of pillar cross section (pillar outer diameter), pillar length and thickness of wall (partition wall, pillar peripheral wall), and average values therefore, and median value of wall thickness]

The pillar outer diameter, the pillar length, and the wall thickness of each of 33 or more activated carbon molded articles were measured using calipers, and an average value of measurement values for each of the pillar outer diameter, the pillar length, and the wall thickness was determined.

The measured wall thickness values were arranged in descending order, and a value located at the center was determined as a median value of the wall thickness.

[Outer Surface Area Per Volume]

The outer surface area per volume of an activated carbon molded article was calculated in accordance with the following formula Outer surface area per volume [m$^2$/L] = [Mathematical formula 3]

$$\frac{(\text{packing density [g/mL]})}{(\text{average weight of activated carbon molded articles [g/molded article]})} \times$$

(Outer surface area per activated carbon molded article [m$^2$/molded article]) × 1000

The packing density in the above formula was determined in accordance with JIS K 1474.

The average weight of activated carbon molded articles in the above formula was determined by measuring the weights of 33 or more activated carbon molded articles which had been dried at 120° C. until each of the weights became constant, and then determining an average value of the measurement values by calculation.

The outer surface area per activated carbon molded article in the above formula was calculated from average values respectively of the pillar outer diameters, the pillar inner diameters, the lengths of partition walls in pillar cross sections, the pillar lengths, and the wall thicknesses of the activated carbon molded articles.

[Wall Thickness (Peripheral Wall Thickness or Partition Wall Thickness) Relative to Longest Outer Dimension of Pillar Cross Section (Pillar Outer Diameter)]

Wall thickness relative to pillar outer diameter [%]=
(wall thickness [mm]/pillar outer diameter [mm])×100 [Mathematical formula 4]

[Ratio of Area of Void Space Part to Area of Wall Part in Pillar Cross Section]

Ratio of area of void space part to area of wall part in pillar cross section [%]=(area of void space part [mm$^2$]/area of wall part [mm$^2$])×100 [Mathematical formula 5]

Each of the area of a wall part and the area of a void space part in a pillar cross section in the above formula was calculated from average values respectively for the pillar outer diameter, the pillar inner diameter, and the length and the wall thickness of a partition wall in a pillar cross section of an activated carbon molded article.

[MS Hardness]

Ten 8-mm steel balls were placed in a steel-made pot having an inner diameter of 25.4 mm and a length of 304.8 mm, then a dried activated carbon molded article (about 5.0 g) (weighed to the order of 0.1 g) was further placed in the steel-made pot, and then the steel-made pot was sealed. The steel-made pot was installed in a measurement device, and was then rotated at a speed of 25 rotations per minute for 40 minutes. Subsequently, the sample was taken out, then the steel balls were removed therefrom, and then the sample after removing the steel balls was sieved through a 50-mesh sieve. In accordance with the following formula, the ratio (unit: %) of the amount of the sample remaining on the sieve to the amount of the sample initially placed in the steel-made pot was calculated, and the ratio was employed as MS hardness.

$$MS \text{ hardness}[\%] = \frac{(\text{weight of sample remaining on sieve [g]})}{(\text{weight of weighed sample before test [g]})} \times 100 \quad \text{Mathematical formula 6}$$

[Working Capacity (SWC), Adsorption Ratio, Purge Efficiency and Residual Amount of Butane]

The working capacity, the adsorption ratio, the purge efficiency and the residual amount of n-butane were determined in accordance with ASTM D5228.

[Amount of Fine Powder]

The amount of fine powder in an activated carbon molded article was determined in accordance with ASTM D2862 in the following manner: an activated carbon molded article to be measured (about 100 g) was weighed (A [g])), and was then sieved through a 60-mesh sieve mesh in a low-tap mode for 10 minutes using a sieve shaking machine, and then the amount of a powder passed through the sieve was weighed (B [g]). The amount of fine powder was determined in accordance with the following formula.

Amount of fine powder [%]=
(B[g]/A[g])×100 [Mathematical formula 7]

[Pore Volume Determined by the BJH Method]

A nitrogen absorption isothermal line at 77K was produced using BELSORP-max (manufactured by Microtrac BEL Corporation), and the pore volume of an activated carbon molded article was determined from the absorption isothermal line employing the BJH method (the Barrett-Joyner-Halenda method).

Example 1

Coal-based activated carbon, which was produced by activating bituminous coal at 1000° C. in a fluidized bed furnace and which had BWC of 15.6 g/dL measured in accordance with ASTM D5228, was pulverized into a powder having an average particle diameter of 25 μm with a pulverizer. In this manner, powdery activated carbon was produced.

The powdery activated carbon (100 parts by mass) was mixed with calcium carbonate (average particle diameter: 7 μm) (60 parts by mass) and a lubricant (MC) (15 parts by mass), and the resultant mixture was kneaded with a binder resin (manufactured by Zeon Corporation, an acrylic emulsion "Nipol LX-851C", solid content: 45% by mass) (35 parts by mass) and water (165 parts by mass).

The resultant kneaded product was extruded into a strand having a cross-sectional shape shown in FIG. 1 with a vacuum extrusion molding machine, then the extruded strand was cut into molded articles each having a length of 3 to 5 mm to prepare a molded product, and then the molded product was dried at 120° C. for 3 hours. Using hydrochloric acid having a concentration of 2 mol/L at a rate of 1 L per 100 g of the dried molded product, the dried molded product was washed by boiling with hydrochloric acid to remove the calcium carbonate component from the molded product. Then, the resultant product was dried at 120° C. for 12 hours to produce an activated carbon molded article. The evaluation results are shown in Table 1.

Example 2

An activated carbon molded article was produced by carrying out the same procedure as in Example 1, except that the kneaded product was extruded with a vacuum extrusion molding machine so that the cross section of the resultant produce had a shape shown in FIG. 2. The evaluation results are shown in Table 1.

Example 3

An activated carbon molded article was produced by carrying out the same procedure as in Example 1, except that the kneaded product was extruded with a vacuum extrusion molding machine so that the cross section of the resultant produce had a shape shown in FIG. 3. The evaluation results are shown in Table 1.

Example 4

An activated carbon molded article was produced by carrying out the same procedure as in Example 1, except that the kneaded product was extruded with a vacuum extrusion molding machine so that the cross section of the resultant produce had a shape shown in FIG. 4. The evaluation results are shown in Table 1.

Comparative Example 1

Powdery activated carbon (100 parts by mass) produced in the same manner as in Example 1 was mixed with calcium carbonate (average particle diameter: 7 μm) (60 parts by mass) and a lubricant (MC) (5 parts by mass), and the resultant mixture was kneaded with a binder resin (manufactured by Zeon Corporation, an acrylic emulsion "Nipol LX-851C", solid content: 45% by mass) (35 parts by mass) and water (165 parts by mass).

The resultant kneaded product was extruded into a cylinder-like strand having a diameter of about 2.5 mm with a hydraulic extrusion molding machine, then the extruded strand was cut into molded articles each having a length of 3 to 4 mm to prepare a molded product, and then the molded product was dried at 120° C. for 3 hours. Using hydrochloric acid having a concentration of 2 mol/L at a rate of 1 L per 100 g of the dried molded product, the dried molded product was washed by boiling with hydrochloric acid to remove the calcium carbonate component from the molded product. Then, the resultant product was dried at 120° C. for 12 hours to produce an activated carbon molded article. The evaluation results are shown in Table 1.

Comparative Example 2

An activated carbon molded article was produced by carrying out the same procedure as in Comparative Example 1, except that coal-based activated carbon, which was produced by activating anthracite coal at 900 to 950° C. in a rotary kiln and which had a BWC of 15.6 g/dL measured in accordance with ASTM D5228, was pulverized into a powder having an average particle diameter of 25 μm with a pulverizer and the powder was used as powdery activated carbon and that the kneaded product was extruded into a cylinder-like product having a diameter of about 2.0 mm. The evaluation results are shown in Table 1.

Comparative Examples 3 to 7

In Comparative Examples 3 to 7, the commercially available activated carbon products shown below were used. Each of these activated carbon products had a cylinder-like shape. The evaluation results for the resultant activated carbon molded products are shown in Table 1.

Comparative Example 3: "2GK" manufactured by Kuraray Co., Ltd.
Comparative Example 4: "BAX-1100" manufactured by Ingevity Corporation
Comparative Example 5: "2GK-H" manufactured by Kuraray Co., Ltd.
Comparative Example 6: "BAX-1500" manufactured by Ingevity Corporation
Comparative Example 7: "BAX-LBE" manufactured by Ingevity Corporation

TABLE 1

| Items | Unit | Example 1 | Example 2 | Example 3 | Example 4 | Comparative Example 1 | Comparative Example 2 |
|---|---|---|---|---|---|---|---|
| Packing density | g/mL | 0.286 | 0.314 | 0.321 | 0.267 | 0.274 | 0.292 |
| Longest outer dimension of pillar cross section | mm | 5.13 | 4.98 | 5.10 | 5.13 | 2.51 | 2.44 |
| Thickness of each of partition wall and pillar peripheral wall | mm | 0.86 | 0.80 | 0.75 | 0.55 | — | — |
| Thickness of partition wall relative to median value of thickness of partition wall | % | within ±3.4 | within ±3.2 | within ±2.9 | within ±3.6 | — | — |
| Thickness of pillar peripheral wall relative to median value of thickness of pillar peripheral wall | % | within ±3.1 | within ±3.1 | within ±3.2 | within ±3.7 | — | — |
| Difference between thickness of each of walls and thickness of pillar peripheral wall relative to longest outer dimension of pillar cross section | % | 0 | 0 | 0 | 0 | — | — |
| Thickness of each of partition wall and pillar peripheral wall relative to longest outer dimension of pillar cross section | % | 16.8 | 16.1 | 14.7 | 10.7 | — | — |

TABLE 1-continued

| | | | | | | |
|---|---|---|---|---|---|---|
| Ratio of area of void space part to area of wall part | % | 33.0 | 22.6 | 23.8 | 42.0 | — | — |
| Average pillar length | mm | 4.72 | 5.07 | 4.98 | 4.74 | 3.76 | 3.93 |
| Average weight per molded article | g | 0.04183 | 0.04665 | 0.04854 | 0.04183 | 0.00784 | 0.00835 |
| Outer surface area per molded article | $m^2$/molded article | 0.00021 | 0.00025 | 0.00026 | 0.00027 | 0.00004 | 0.00004 |
| Outer surface area per volume | $m^2$/L | 1.411 | 1.714 | 1.744 | 1.729 | 1.379 | 1.376 |
| Specific surface area per volume | $m^2$/mL | 339.48 | 37335 | 379.74 | 461.76 | 38524 | 301.81 |
| BET specific surface area | $m^2$/g | 1187.0 | 1189.0 | 1183.0 | 1184.0 | 1406.0 | 1033.6 |
| Pore volume determined by the HK method | mL/g | 0.6508 | 0.6513 | 0.6497 | 0.6507 | 0.773 | 0.6757 |
| Average pore diameter determined by the HK method | nm | 2.19 | 2.19 | 2.20 | 2.20 | 2.20 | 2.61 |
| Butane working capacity | g/dL | 8.89 | 9.70 | 9.80 | 8.29 | 9.78 | 9.58 |
| Butane adsorption ratio | % | 35.1 | 34.5 | 34.2 | 34.8 | 41.4 | 37.2 |
| Purge efficiency | % | 88.7 | 89.5 | 89.3 | 89.2 | 86.2 | 87.6 |
| Residual amount | g/dL | 1.13 | 1.14 | 1.17 | 1.00 | 1.56 | 1.36 |
| MS hardness | % | 84 | 80 | 79 | 85 | 69 | 68 |
| Amount of fine powder | % | 0.01 | 0.01 | 0.02 | 0.01 | 0.03 | 0.04 |
| Pore volume determined by the BJH method | mL/g | 0.525 | 0.531 | 0.523 | 0.528 | 0.618 | 0.561 |

| Items | Comparative Example 3 | Comparative Example 4 | Comparative Example 5 | Comparative Example 6 | Comparative Example 7 |
|---|---|---|---|---|---|
| Packing density | 0.386 | 0.380 | 0.338 | 0.303 | 0.399 |
| Longest outer dimension of pillar cross section | 2.37 | 2.16 | 2.02 | 2.24 | 2.20 |
| Thickness of each of partition wall and pillar peripheral wall | — | — | — | — | — |
| Thickness of partition wall relative to median value of thickness of partition wall | — | — | — | — | — |
| Thickness of pillar peripheral wall relative to median value of thickness of pillar peripheral wall | — | — | — | — | — |
| Difference between thickness of each of walls and thickness of pillar peripheral wall relative to longest outer dimension of pillar cross section | — | — | — | — | — |
| Thickness of each of partition wall and pillar peripheral wall relative to longest outer dimension of pillar cross section | — | — | — | — | — |
| Ratio of area of void space part to area of wall part | — | — | — | — | — |
| Average pillar length | 4.07 | 4.57 | 3.32 | 3.19 | 5.02 |
| Average weight per molded article | 0.00945 | 0.00886 | 0.00460 | 0.00518 | 0.01090 |
| Outer surface area per molded article | 0.00004 | 0.00004 | 0.00003 | 0.00003 | 0.00004 |
| Outer surface area per volume | 1.596 | 1.641 | 2.015 | 1.777 | 1.546 |
| Specific surface area per volume | 549.55 | 546.06 | 59255 | 797.95 | 256.73 |
| BET specific surface area | 1423.7 | 1437.0 | 1753.1 | 2633.5 | 643.4 |
| Pore volume determined by the HK method | 0.749 | 0.6976 | 0.8873 | 1.2651 | 0.3369 |
| Average pore diameter determined by the HK method | 2.10 | 1.94 | 2.02 | 1.92 | 2.09 |
| Butane working capacity | 11.38 | 11.63 | 12.77 | 14.79 | 5.89 |
| Butane adsorption ratio | 38.0 | 35.7 | 47.0 | 58.8 | 17.0 |
| Purge efficiency | 79.9 | 85.9 | 86.2 | 83.1 | 86.7 |
| Residual amount | 2.87 | 1.92 | 2.04 | 3.02 | 0.90 |
| MS hardness | 60 | 19 | 48 | 40 | 55 |
| Amount of fine powder | 0.08 | 0.17 | 0.13 | 0.15 | 0.19 |
| Pore volume determined by the BJH method | 0.473 | 0.629 | 0.613 | 0.877 | 0.360 |

As shown in Table 1, each of the activated carbon molded articles of the present invention (Examples 1 to 4), which had the specified specific surface area per volume calculated from a specific surface area determined by the BET multipoint method and a packing density determined in accordance with JIS K 1474 and the specified outer surface area per volume, had all of the desired butane working capacity, the high purge efficiency and the small butane residual amount. From this result, it is suggested that, when the activated carbon molded article of the present invention is used in a canister, the canister can achieve both of satisfactory adsorption of an evaporated fuel and low evaporated fuel emission performance. Furthermore, the activated carbon molded article of the present invention also has a small fine powder amount and high MS hardness. These characteristic properties are advantageous for the application to a canister for which improved abrasion strength is required.

On the other hand, each of the activated carbon molded articles (Comparative Examples 1 to 7), which did not have the specified specific surface area per volume calculated from a specific surface area determined by the BET multipoint method and a packing density determined in accordance with JIS K 1474 or the specified outer surface area per volume, did not have all of the desired butane working capacity, the high purge efficiency and the small butane residual amount. Each of the activated carbon molded articles of Comparative Examples 4 to 7 had a high fine powder amount and low MS strength. Therefore, it was demonstrated that these activated carbon molded articles were inferior to the activated carbon molded articles of the present invention in practical use applications, particularly when applied to a canister.

INDUSTRIAL APPLICABILITY

The activated carbon molded article of the present invention can have all of the desired butane working capacity, the high purge efficiency and the small butane residual amount, and therefore has excellent adsorption performance as well as excellent desorption performance. Therefore, the activated carbon molded article of the present invention is useful as an adsorbent for gas adsorption purposes. In particular, the activated carbon molded article of the present invention has excellent desorption performance, and is therefore useful as an adsorbent for use in, for example, the treatment of an evaporated fuel emitted from an automotive fuel tank.

The invention claimed is:

1. An activated carbon molded article, having
a pillar structure,
a specific surface area per volume, calculated from a specific surface area determined by a BET multipoint method and a packing density determined in accordance with JIS K 1474, in a range of from 290 to 520 $m^2/mL$, and
an outer surface area per volume in a range of from 1.4 $m^2/L$ or more,
wherein the pillar structure has a pillar axis direction corresponding to a longest dimension of pillar structure,
wherein the pillar structure comprises: (i) a pillar peripheral wall comprising, in an inside thereof, a first hollow part opening at a first end in the pillar axis direction and a second hollow part opening at a second end in the pillar axis direction; and (ii) a partition wall extending from the first to the second hollow part opening, to divide the hollow part into compartments, and
wherein a void-to-wall ratio, of an area of a void space part to an area of a wall part in a pillar cross section, to which the pillar axis direction is orthogonal, is in a range of from 20 to 50%.

2. The article of claw 1, wherein the pillar structure comprises the partition wall, as a first partition wall and further comprises a second partition wall,
wherein the partition walls are connected to the pillar peripheral wall, and
wherein the partition walls are not connected to each other.

3. The article of claim 1, comprising one, two, or three of the partition wall, the partition walls each having a first and a second end, and
wherein each of the one, two, or three partition walls is connected, at both ends thereof, to the pills peripheral wall.

4. The article of claim 1, comprising a plurality of the partition wall, which are connected to each other at a position located on the pillar peripheral wall to form the triangular shape.

5. The article of claim 1, comprising a plurality of the partition wall, wherein the plurality comprises an inner wall, a first connecting wall, and a second connecting wall.

6. The article of claim 5, when, in the pillar cross section, the inner wall has a circular shape, an elliptical shape, a triangular shape, or a quadrangular shape.

7. The article of claim 1, wherein thickness of the partition wall varies in a range of from −5% to +5% of a median thickness of the partition wall.

8. The article of claim 1, wherein a thickness of the pillar peripheral wall varies in range of from −5% to +5% of a median value of the thickness of the pillar peripheral wall.

9. The article of class 1, wherein, in the pillar cross section, a difference between a thickness of the partition wall and a thickness of the pillar peripheral wall is 5% or less of a longest outer dimension a of the pillar cross section.

10. The article of claw 1, wherein cross-sectional shapes of the pillar structure observed in the pillar axis direction are identical to each other.

11. The article of claim 1, wherein, in the pillar cross section, each thickness of the pillar peripheral wall and each thickness of the partition wall is in a range of from 5 to 35% of a longest outer dimension of the pillar cross section.

12. The article of claim 1, wherein each thickness of the pillar peripheral wall and each thickness of the partition wall is in a range of from 0.3 to 1.0 mm.

13. The article of claim 1, wherein a void-to-wall ratio, of an area of a void space part to an area of a wall part in the pillar cross section, is in a range of from 20 to 50%.

14. The article of claim 1, wherein & longest outer dimension of the pillar cross section is in a range of from 3 to 9 mm.

15. The article of claim 1, having an average pore diameter, determined by the HK method, in a range of from 2.1 to 2.6 mm.

16. The article of claim 1, having a butane working capacity, determined in accordance with ASTM D5228, in a range of from 8.0 to 10 g/dL.

17. The article of claim 1, having a pore volume, determined by the BJH method, is a range of from 0.480 to 0.555 mL/g.

18. The article of claim 1, comprising a plurality of the partition wall, which are connected to each other at a position located on the pillar peripheral wall to form a quadrangular cross-sectional shape.

19. The article of claim 1, comprising a plurality of the partition wall, which are connected to each other at a position located on the pillar peripheral wall to form a pentagonal cross-sectional shape.

20. The article of claim 1, comprising a plurality of the partition wall comprising an inner wall, a first connecting wall, a second connecting wall, and a third Connecting wall.

21. A canister, comprising
the activated carbon molded article of claim 1.

22. A method for producing the activated carbon molded article of claim 1, the method comprising:
  maxing powdery or granular activated carbon, a lubricant, and a solid diluent that is soluble in an acid together to prepare a mixture;
  kneading the mixture with a binder and water to prepare kneaded product, and then molding the kneaded product into a desired shape to prepare a molded article; and
  drying the molded article, then washing the dried molded article with the acid to elute and remove at least a portion of the sold diluent to prepare a resultant product, and then drying be resultant product.

* * * * *